United States Patent
Shen (10) Patent No.: US 9,649,913 B2
(45) Date of Patent: May 16, 2017

(54) COWL LOUVER CLIP ASSEMBLIES FOR COWL LOUVER STRUCTURES FOR SUPPORTING WINDSHIELDS

(71) Applicant: Toyota Motor Engineering & Manufacturing North America, Inc., Erlanger, KY (US)

(72) Inventor: Mingher Fred Shen, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 73 days.

(21) Appl. No.: 14/601,374

(22) Filed: Jan. 21, 2015

(65) Prior Publication Data

US 2016/0207377 A1    Jul. 21, 2016

(51) Int. Cl.
| | |
|---|---|
| *B60J 1/00* | (2006.01) |
| *B60J 1/02* | (2006.01) |
| *B60J 10/70* | (2016.01) |
| *B62D 25/08* | (2006.01) |

(52) U.S. Cl.
CPC ............ *B60J 1/006* (2013.01); *B60J 1/02* (2013.01); *B60J 10/70* (2016.02); *B62D 25/081* (2013.01)

(58) Field of Classification Search
CPC .... B60J 10/02; B60J 10/0051; B60J 10/0062; B60J 1/006; B60J 1/02; B60J 10/0011; B60J 10/0014; B62D 25/081; B62D 25/08; B60R 2021/343; B60R 21/34; B60R 13/07; B60R 13/04; B60R 13/06; B60R 13/0815; B60R 13/0838

USPC ......... 296/201, 192, 93, 208, 146.15, 96.21; 49/490.1, 475.1; 29/428
See application file for complete search history.

(56) References Cited

U.S. PATENT DOCUMENTS

| | | | |
|---|---|---|---|
| 3,720,030 A * | 3/1973 | Krodel | B60J 10/265 52/204.597 |
| 4,349,993 A | 9/1982 | Tanaka et al. | |
| 5,176,420 A * | 1/1993 | Kato | B60J 1/2002 296/93 |
| 6,769,700 B2 | 8/2004 | Ortmuller et al. | |
| 7,203,990 B2 * | 4/2007 | Mayer | B60S 1/32 15/250.31 |
| 7,918,058 B2 * | 4/2011 | Debailleul | B60J 10/235 296/146.15 |
| 8,444,205 B2 | 5/2013 | Flammer et al. | |
| 8,449,016 B2 | 5/2013 | Timmermann | |
| 8,757,706 B2 | 6/2014 | Sasaki | |
| 2004/0124669 A1 * | 7/2004 | Eynon | B62D 25/081 296/192 |

(Continued)

FOREIGN PATENT DOCUMENTS

| | | |
|---|---|---|
| JP | 2010264868 | 11/2010 |
| WO | WO2013073649 | 5/2013 |

*Primary Examiner* — Glenn Dayoan
*Assistant Examiner* — Sunsurraye Westbrook
(74) *Attorney, Agent, or Firm* — Dinsmore & Shohl LLP (57) ABSTRACT

A cowl louver clip assembly includes a protrusion receiving body including a windshield receiving end, a windshield engaging top and a protrusion receiving end. A protector member extends along the windshield engaging top and windshield receiving end. The protrusion receiving body has a volume configured to receive a support protrusion of a cowl louver structure.

19 Claims, 6 Drawing Sheets

(56) References Cited

U.S. PATENT DOCUMENTS

2013/0033071 A1    2/2013  Kurata et al.
2014/0327267 A1*  11/2014  Deussen .................. B60J 10/18
                                                           296/93

* cited by examiner

COWL LOUVER CLIP ASSEMBLIES FOR COWL LOUVER STRUCTURES FOR SUPPORTING WINDSHIELDS

TECHNICAL FIELD

The present specification generally relates to cowl louver structures and vehicles that include cowl louver structures, and more specifically, cowl louver clip assemblies for use in supporting a windshield.

BACKGROUND

Vehicles are often provided with cowl structures that divide an engine room of the vehicle and an interior of the vehicle. The cowl structures may include a cowl louver structure that is supported by a cowl panel. The cowl louver structure may be provided with air inlets to draw air from the environment therethrough, for example, for air conditioning for the vehicle interior.

In some vehicles, the cowl louver structure is not only used to cover parts of the cowl panel, but is also supported by a front windshield. Windshields are often non-planar structures which can make installation with the cowl louver structures challenging. Accordingly, a need exists for structures that facilitate installation of windshields and cowl louver structures.

SUMMARY

In one embodiment, a cowl louver clip assembly includes a protrusion receiving body including a windshield receiving end, a windshield engaging top and a protrusion receiving end. A protector member extends along the windshield engaging top and windshield receiving end. The protrusion receiving body has a volume configured to receive a support protrusion of a cowl louver structure.

In another embodiment, a vehicle includes a cowl louver structure including a windshield receiving recess that extends in a vehicle lateral direction. A windshield is located in the windshield receiving recess. A cowl louver clip assembly is located in the windshield receiving recess engaging the windshield. The cowl louver clip assembly includes a protrusion receiving body including a windshield receiving end, a windshield engaging top and a protrusion receiving end. The protrusion receiving body has a volume in which a support protrusion of the cowl louver structure is located. A protector member extends along the windshield engaging top of the protrusion receiving body. The protector member is engaged with the windshield along the windshield engaging top.

In another embodiment, a method of connecting a windshield to a cowl louver structure of a vehicle is provided. The method includes providing a cowl louver clip assembly that includes a protrusion receiving body including a windshield receiving end, a windshield engaging top and a protrusion receiving end. The protrusion receiving body having a volume configured to receive a support protrusion of a cowl louver structure. A protector member extends along the windshield engaging top of the protrusion receiving body. A support projection of the cowl louver structure is inserted into the volume of the protrusion receiving body of the cowl louver clip assembly thereby placing the cowl louver clip assembly within a windshield receiving recess of the cowl louver structure such that a gap is formed between the windshield engaging top of the protrusion receiving body and an outer support wall of the cowl louver structure. A windshield is inserted into the gap formed between the windshield engaging top of the protrusion receiving body and the outer support wall of the cowl louver structure with the protector member engaging the windshield.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include a cowl structure that is located between a front windshield and an engine room of the vehicles. The cowl structure includes a cowl louver structure that is supported by a cowl panel, providing a support structure for the cowl louver structure. The cowl louver structure includes a windshield receiving recess that extends in a vehicle lateral direction and that is sized and arranged to receive a bottom edge of the front windshield therein. A cowl louver clip assembly is provided that can separately attach to the cowl louver structure along the windshield receiving recess to provide an engaging pressure against the front windshield to support the cowl louver structure with the bottom edge of the front windshield within the windshield receiving recess.

Figure 1:
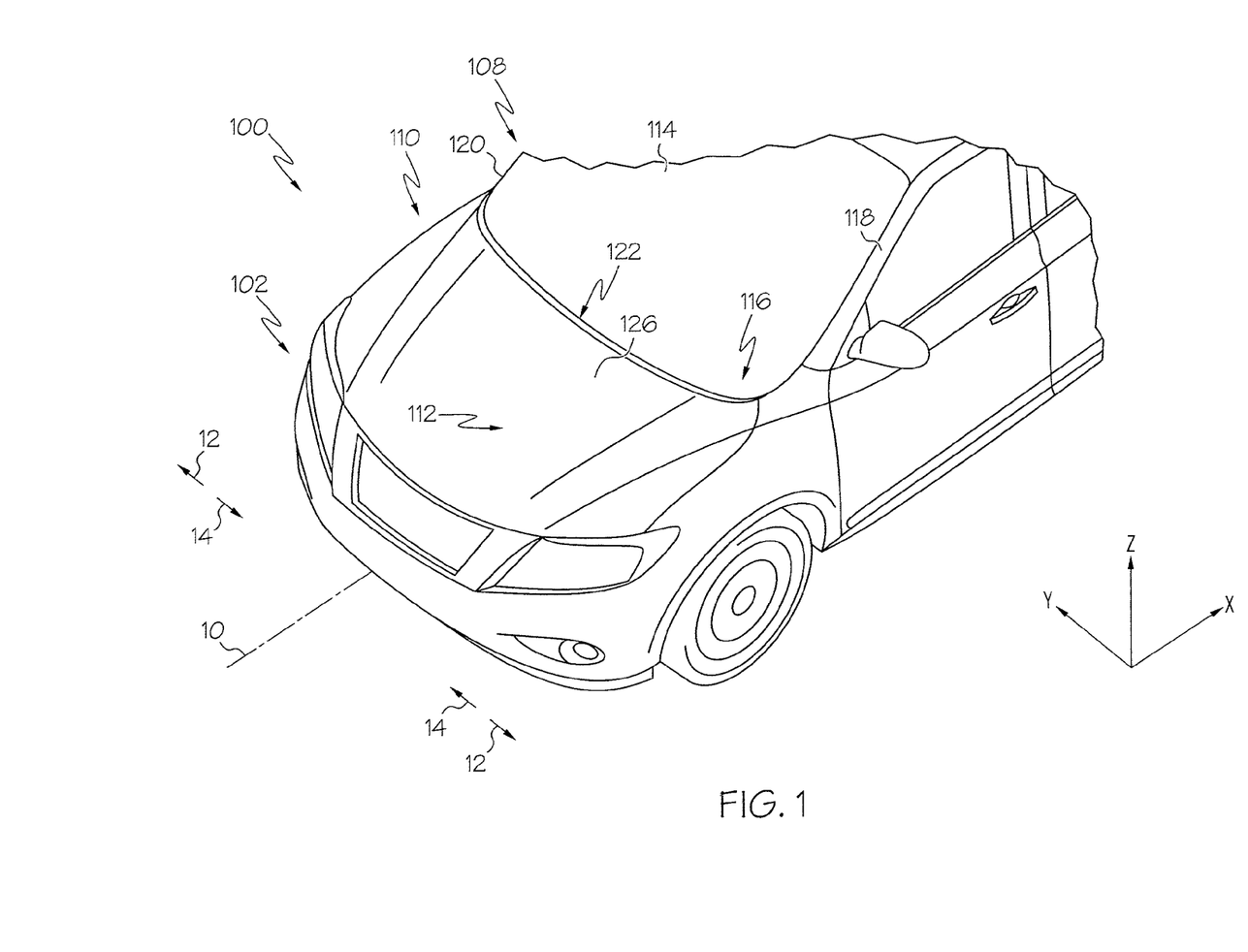
FIG. 1 schematically depicts a perspective view of a vehicle according to one or more embodiments shown or described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard" and "outboard" are used to describe the relative positioning of various components of the vehicle. Referring to FIG. 1, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Referring initially to FIG. 1, a vehicle 100 is depicted. The vehicle 100 includes a body 110 onto which a vehicle drivetrain is coupled. The vehicle 100 also includes a cabin 108 that is integral with the body 110 and an engine bay 112 where a power unit (e.g., engine and transmission) is located. The cabin 108 generally defines a passenger cabin of the vehicle 100. A front windshield 114 is provided at a front of the passenger cabin 108. The front windshield 114 may be framed by a cowl structure 116, a pair of front or A pillars 118 and 120 and a roof header of a roof. A cowl louver structure 122 is used to receive a bottom edge of the front windshield 114. The cowl structure 116 can function as a lower end support of the front windshield 114 at the rear end of the engine bay 112, as will be described in greater detail below.

Motor vehicles that incorporate elements according to the present disclosure may include a variety of construction methodologies that are conventionally known, including the unibody construction methodology as well as a body-on-frame construction methodology. Additionally, the Figures may only show a portion or side of the vehicle. Descriptions of the other side of the vehicle may be omitted because both sides and other portions of the vehicle may be substantially the same.

Figure 2:
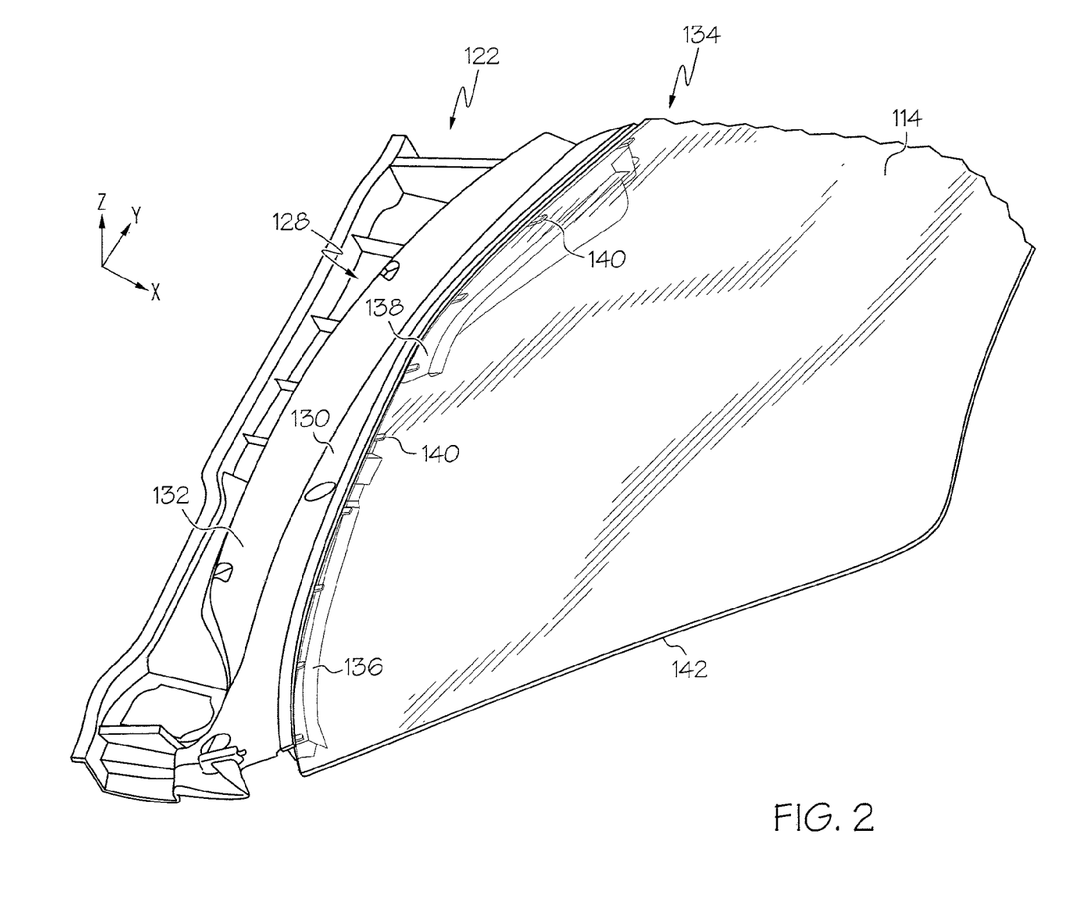
FIG. 2 depicts a top, perspective view of a cowl louver structure and front windshield for the vehicle of FIG. 1 according to one or more embodiments shown or described herein.

Referring to FIG. 2, the cowl louver structure 122 and front windshield 114 are shown in isolation. The cowl louver structure 122 may be provided above a cowl panel in an area between a vehicle hood 126 and the front windshield 114 (FIG. 1) to cover an upward opening in the cowl panel. The cowl louver structure 122 may generally extend in the vehicle lateral direction and be provided with air inlets 128 that allow outside air from the environment to be drawn to the cowl structure 116. This air can be used, for example, for the air conditioning or sent directly to the vehicle interior (e.g., via ducts). The cowl louver structure 122 includes a louver body 130 including the air inlets 128. An air guide structure 132 may be provided that extends laterally along a rear side of the air inlets 128 and at least partially overhangs the air inlets 128 to direct air from the environment into the air inlets 128, particularly during movement of the vehicle.

The cowl louver structure 122 further includes a windshield engagement structure 134 that extends laterally along a rear edge 136 of the louver body 130. As can be seen, the windshield engagement structure 134 is shaped and arranged to receive a bottom edge 138 of the front windshield 114 to engage the bottom edge 138 of the front windshield 114. A plurality of cowl louver clip assemblies 140 are provided along the windshield engagement structure 134. The cowl louver clip assemblies 140 may be located to an interior side 142 of the front windshield 114 and spaced-apart from each other in the vehicle lateral direction. The cowl louver clip assemblies 140 may provide discrete, spaced apart support areas that are used to engage the front windshield 114 in the illustrated position.

Figure 3:
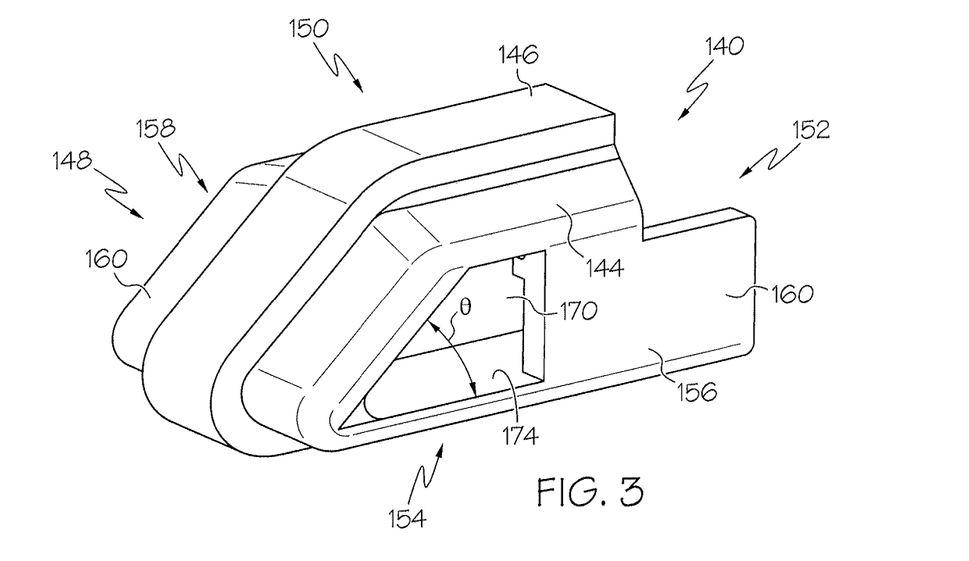
FIG. 3 depicts a side, perspective view of a cowl louver clip assembly for use with the cowl louver structure of FIG. 2 according to one or more embodiments shown or described herein.
Figure 4:
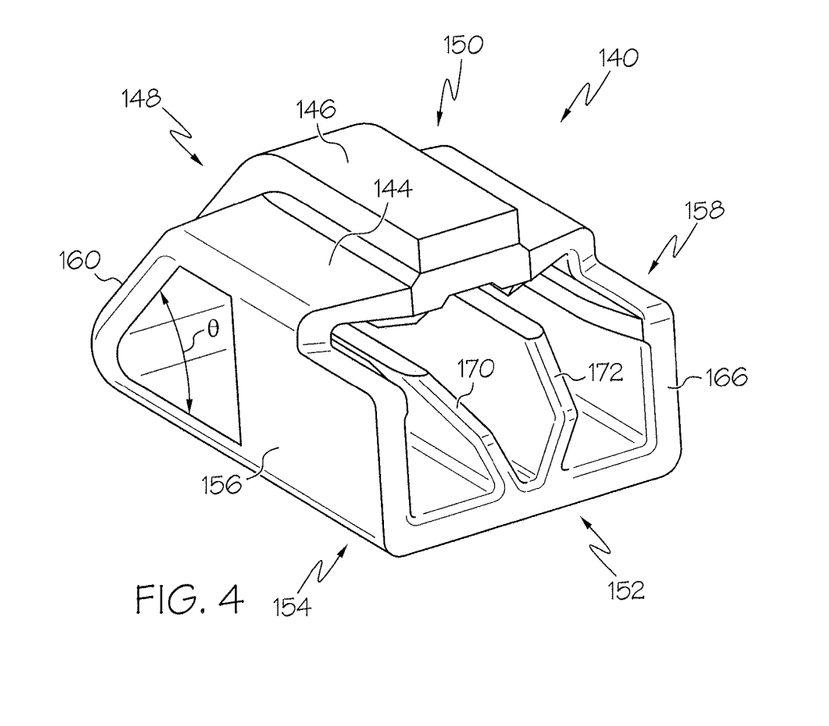
FIG. 4 depicts a rear, perspective view of the cowl louver clip assembly of FIG. 3.
Figure 5:
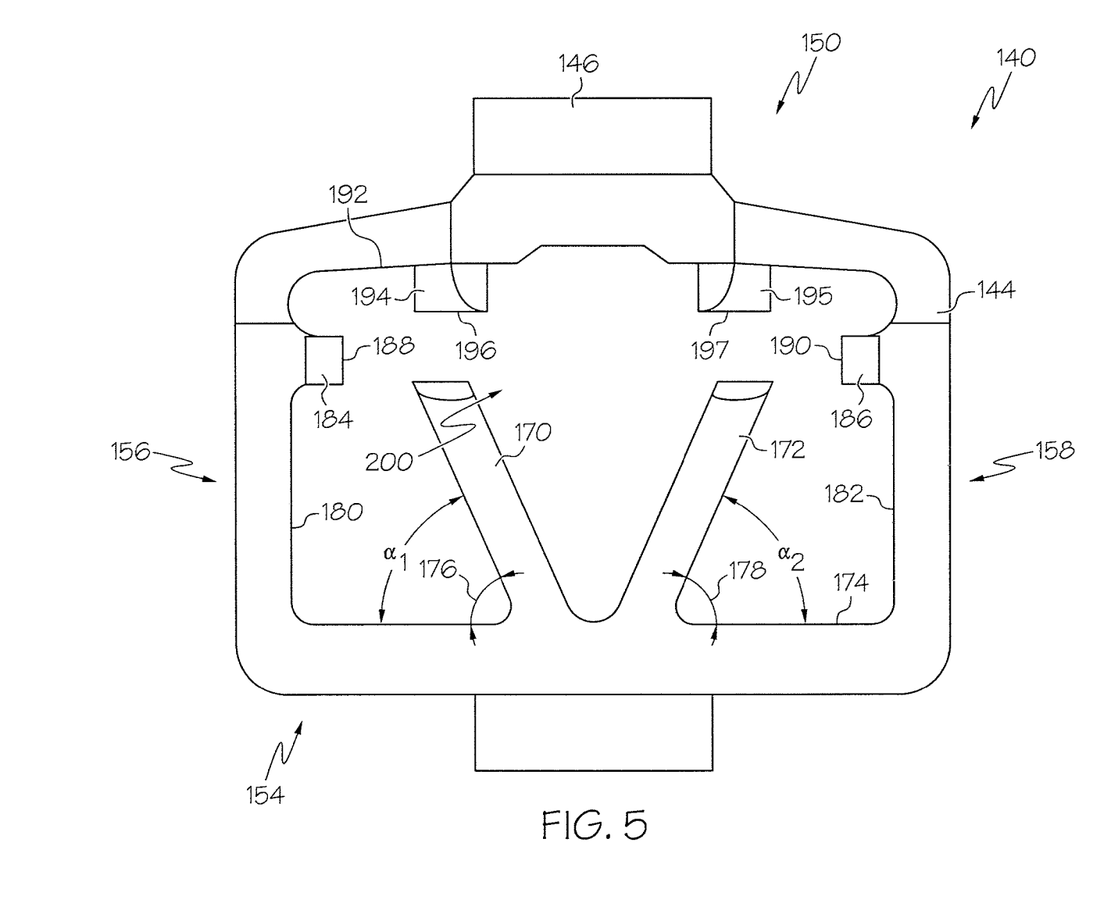
FIG. 5 depicts a rear view of the cowl louver clip assembly of FIG. 3.

FIGS. 3-5 illustrate the cowl louver clip assembly 140 in isolation. The cowl louver clip assembly 140 includes a protrusion receiving body 144 and a protector member 146 extending along the protrusion receiving body 144. The protrusion receiving body may be made of any suitable material, such as a molded plastic material. The protrusion receiving body 144 includes a windshield receiving end 148, a windshield engaging top 150, a protrusion receiving end 152 opposite the windshield engaging end 150 and a wall engaging bottom 154 opposite the windshield engaging top 150. Side walls 156 and 158 extend between the windshield receiving end 148, the windshield engaging top 150, the protrusion receiving end 152 and the wall engaging bottom 154. The windshield receiving end 148 includes an angled guide surface 160 that extends at an oblique angle to the windshield engaging top 150 and the wall engaging bottom 154. For example, in some embodiments, the angle θ between the guide surface 160 and the wall engaging bottom 154 may be less than 90 degrees, such as less than about 75 degrees, such as less than about 60 degrees, such as 45 degrees or less. Such an oblique arrangement for the guide surface 160 can provide a wide lead-in angle for inserting the front windshield 114, as will be described below.

The protrusion receiving body 144 includes an extension portion 166 that extends outwardly beyond the windshield engaging top 150, providing a somewhat open top portion 168 at the extension portion 166. Engaging arms 170 and 172 are provided that extend outwardly from an inner surface 174 of the wall engaging bottom 154. In the illustrated embodiment, two engaging arms 170 and 172 are provided that extend upwardly from the surface 174 at angles $\alpha_1$ and $\alpha_2$, respectively (FIG. 5). In the illustrated embodiment, $\alpha_1$ and $\alpha_2$ may be substantially the same. In other embodiments, $\alpha_1$ and $\alpha_2$ may be different. The angles $\alpha_1$ and $\alpha_2$ may facilitate some resilient flexibility for the engaging arms 170 and 172 to rotate in the directions of arrows 176 and 178, away from each other to accommodate variances in installation. While two engaging arms 170 and 172 are illustrated, there may be one or more than two engaging arms, depending, for example, on the particular installation. In some embodiments, one or more of the engaging arms may be substantially perpendicular to the inner surface 174.

Referring particularly to FIG. 5, extending outwardly from inner surfaces 180 and 182 of the side walls 156 and 158, respectively, are side guide projections 184 and 186. The side guide projections 184 and 186 extend outwardly substantially perpendicularly from the inner surfaces 180 and 182 to ends 188 and 190. Extending outwardly from an inner surface 192 of the windshield engaging top 150 are top guide projections 194 and 195. The top guide projections 194 and 195 extend outwardly substantially perpendicularly from the inner surface 192 to ends 196 and 197. The engaging arms 170 and 172, side guide projections and top guide projection 194 form a volume 200 to receive a support protrusion 224 (FIG. 6A), as will be described below.

Figure 7:
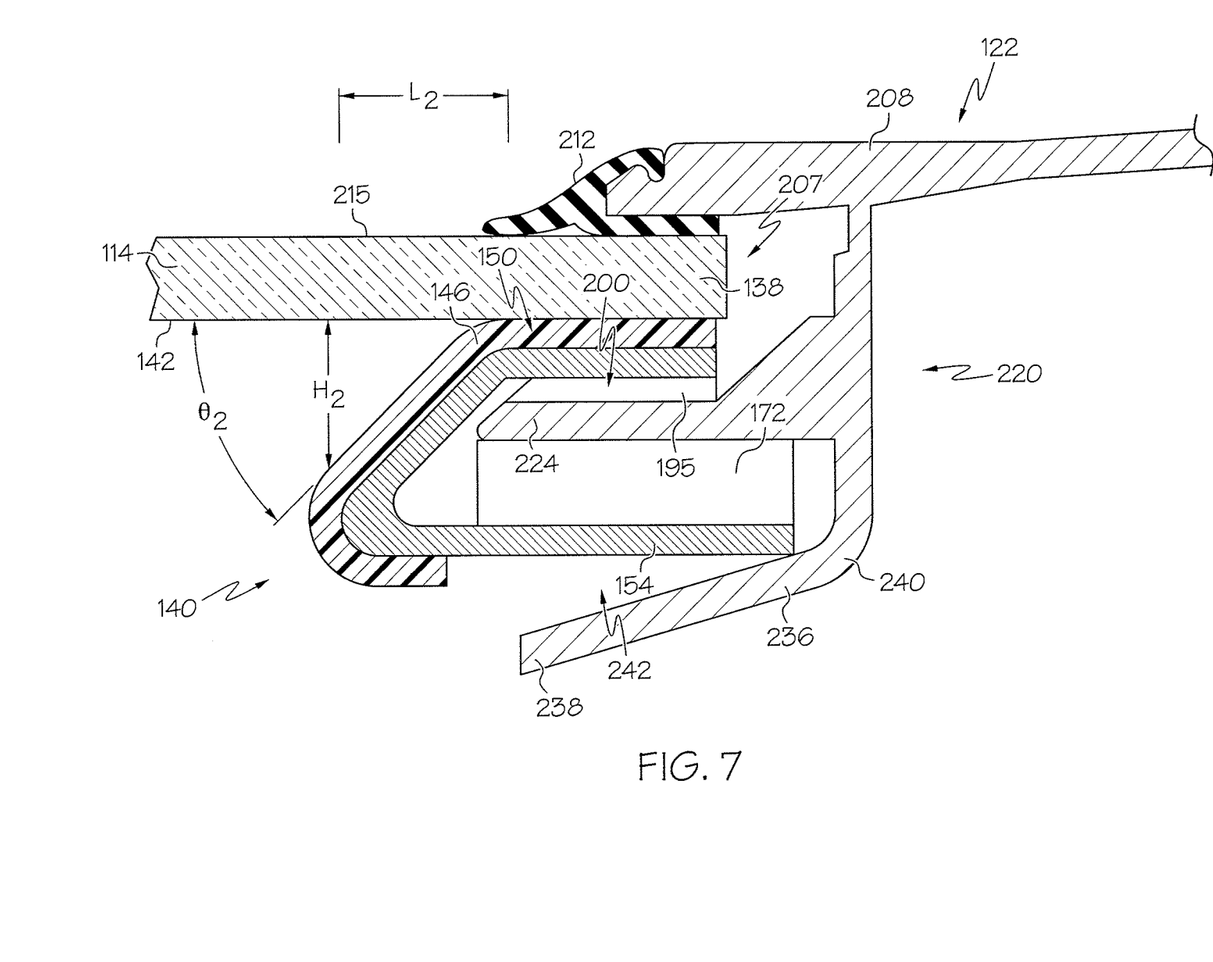
FIG. 7 depicts a section view of the cowl louver clip of FIG. 2 connected with the cowl louver structure of FIG. 2 according to one or more embodiments shown or described herein.

Referring again to FIGS. 3-5, the cowl louver clip assembly 140 further includes the protector member 146. The protector member 146 is formed as a raised strip of resiliently compressible material (e.g., plastic, foam, rubber, etc.) that extends over the windshield receiving end 148, the windshield engaging top 150 and the wall engaging bottom 154. In some embodiments, the protector member 146 may extend over substantially all the length or perimeter of the windshield receiving end 148, the windshield engaging top 150 and the wall engaging bottom 154. In some embodiments, the protector member 146 may extend over only a portion of the length of the wall engaging bottom 154 (FIG. 7). In the illustrated embodiment, the protector member 146 extends over only a portion of the width of the protrusion receiving body 144 at each of the windshield receiving end 148, the windshield engaging top 150 and the wall engaging bottom 154. In some embodiments, the protector member 146 may extend over no more than about 50 percent of the width (e.g., no more than about 35 percent of the width, such as no more than about 25 percent of the width) of the protrusion receiving body 144 at the windshield receiving end 148, the windshield engaging top 150 and the wall engaging bottom 154. In other embodiments, the protector member 146 may extend over the entire width of the protrusion receiving body 144 at the windshield receiving end 148, the windshield engaging top 150 and the wall engaging bottom 154. Further, while the protector member 146 is shown as having a substantially constant width at each of the windshield receiving end 148, the windshield engaging top 150 and the wall engaging bottom 154, the protector member 146 may have varying widths. The protector member 146 may be a single material or combination of materials, such as foam or rubber laminated or coated with a plastic film.

Figure 6A:
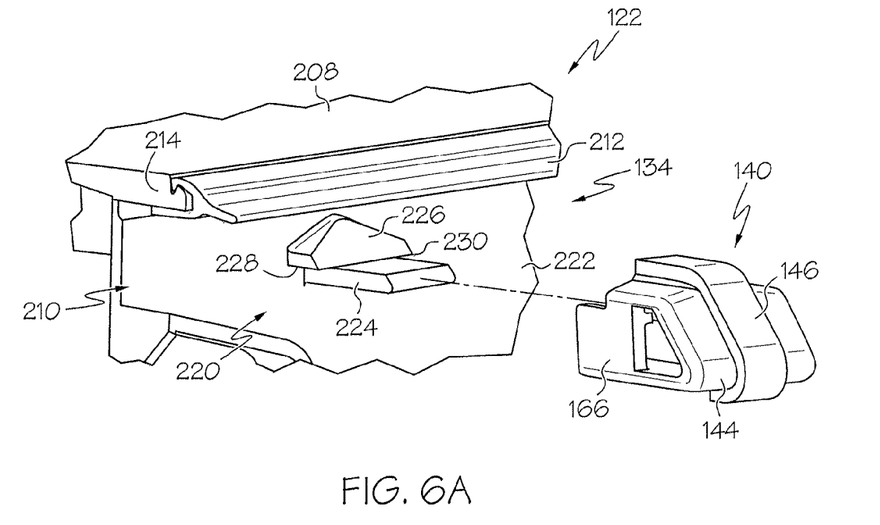
FIGS. 6A and 6B depict a process of installing the cowl louver clip assembly of FIG. 3 to the cowl louver structure of FIG. 2 in preparation for installation of a front windshield.
Figure 6B:
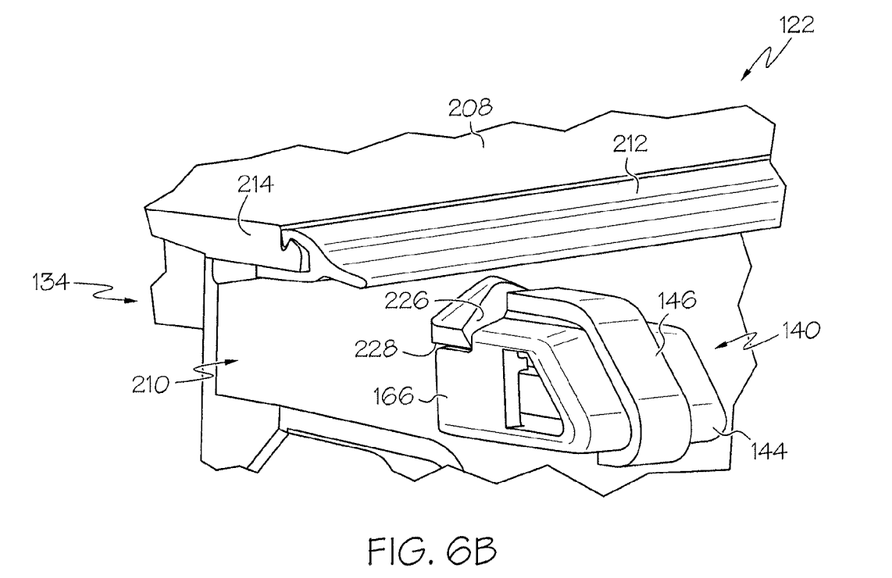

FIGS. 6A and 6B illustrate a process of installation of the cowl louver clip assembly 140 to the cowl louver structure 122 in preparation for installation of the front windshield 114 (FIG. 2). The cowl louver structure 122 includes the windshield engagement structure 134 that includes an outer support wall 208 and a windshield receiving recess 210 adjacent the outer support wall 208. A seal member 212 may extend along an outer edge 214 of the outer support wall 208 that can seal against the exterior side 215 (FIG. 7) of the front windshield 114.

Referring particularly to FIG. 6A, a support structure 220 extends outwardly from a floor 222 of the windshield receiving recess 210. The support structure 220 may include a support protrusion 224 and a base structure 226. In the illustrated embodiment, both the base structure 226 and the support protrusion 224 extend directly from the floor 222 of the windshield receiving recess 210 with the support protrusion 224 adjacent the base structure 226 in the vehicle vertical direction. Referring also to FIG. 6B, the base structure 226 is also wider than the support protrusion 224 in the vehicle lateral direction providing an overhang 228 and 230 that can receive the extension portion 166 of the protrusion receiving body 144 and provide resistance against turning of the cowl louver clip assembly 140 due to weight of the front windshield 114 (FIG. 7) with the support protrusion 224 received within the volume 200 (FIG. 5).

Referring now to FIG. 7, a more detailed section view of the cowl louver clip assembly 140 connected to the support structure 220 is illustrated. As can be seen, the cowl louver clip assembly 140 is connected to the support structure 220 by inserting the support protrusion 224 into the volume 200 of the protrusion receiving body 144. In instances where the height or thickness of the support protrusion 224 is more than the height of the volume 200, the engaging arms 170 and 172 may have flexibility to bend and increase the volume 200 for receiving the support protrusion 224. The engaging arms 170 and 172 may also be resilient to bias the engaging arms 170 and 172 against the support protrusion 224 to provide a friction engagement therebetween.

Inserting the support protrusion 224 into the volume 200 of the protrusion receiving body 144 can cause the wall engaging bottom 154 to engage and slide along an inner support wall 236. As can be seen, a free end 238 of the inner support wall 236 is spaced further from the support protrusion 224 than a cantilevered end 240 opposite the free end 238. Such an arrangement can provide a relatively wide opening 242 through which the wall engaging bottom 154 of the protrusion receiving body 144 can be received. Further, the opening 242 narrows from the free end 238 such that the wall engaging bottom 154 eventually engages the inner support wall 236, which can tend to increase the friction engagement between the support protrusion 224 and the engaging arms 170 and 172.

FIG. 7 illustrates the cowl louver clip assembly 140 being used to engage the bottom edge 138 of the front windshield 114. The front windshield 114 may be sandwiched within a gap 207 between the outer support wall 208 of the cowl louver structure 122 and the windshield engaging top 150 of the cowl louver clip assembly 140. The seal member 212 and the protector member 146 may be located to directly engage opposite sides 215 and 142, respectively. Any suitable materials may also be used to adhere to the front windshield 114, such as tape, adhesives, etc. The cowl louver clip assembly 140 can allow for adjustment of the windshield receiving recess 210, between the outer support wall 208 and the support protrusion 224. Tuning of the cowl louver clip assembly 140 can be accomplished by changing dimensions of the guide projections 184 and 186 (FIG. 5), top guide projections 194 and 195 and engaging arms 170 and 172. The cowl louver clip assembly 140 can also facilitate insertion of the front windshield 114 between the cowl louver clip assembly 140 and the outer support wall 208. For example, the cowl louver clip assembly 140 can provide a relatively large lead-in angle $\theta_L$ (e.g., greater than about 40 degrees, such as greater than about 45 degrees) measured between the front windshield 114 and the windshield receiving end 148. The cowl louver clip assembly 140 can also provide a relatively large lead-in height $H_L$, which is the height of the windshield receiving end 148 (e.g., greater than about 11 mm, such as greater than about 15 mm) and a relatively large lead-in length $L_L$, which is the length of the windshield receiving end 148 (e.g., greater than about 0.5 mm, such as greater than about 5 mm, such as greater than about 9 mm).

The above-described cowl louver clip assemblies are provided that can separately attach to the cowl louver structures along the windshield receiving recesses at multiple locations to provide an engaging pressure against the front windshields to engage bottom edges of the front windshields within the windshield receiving recesses. The cowl louver clip assemblies can improve the installation effort of installing front windshields by increasing a lead-in angle for the front windshields, increasing dimensions of a lead-in opening that receives the front windshield and increasing a lead-in length to more easily catch and guide the front windshields during assembly. Further the cowl louver clip assemblies can be tuned for a desired fit before or even after a start of production of a particular vehicle.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cowl louver clip assembly comprising:
   a protrusion receiving body including a windshield receiving end having a guide surface, a windshield engaging top, wherein the guide surface extends from the windshield engaging top at an oblique angle relative to the windshield engaging top, and a protrusion receiving end; and
   a protector member that extends along the windshield engaging top and windshield receiving end;
   wherein the protrusion receiving body has a volume configured to receive a support protrusion of a cowl louver structure.

2. The cowl louver clip assembly of claim 1, wherein:
   the protrusion receiving body includes a wall engaging bottom; and
   the guide surface of the windshield receiving end extends between the windshield
   engaging top and the wall engaging bottom.

3. The cowl louver clip assembly of claim 2, wherein an angle between the guide surface and the wall engaging bottom is between about 30 and about 60 degrees.

4. The cowl louver clip assembly of claim 1, wherein the protrusion receiving body includes a wall engaging bottom having an inner surface and an engaging arm that extends toward the windshield engaging top from the inner surface of the wall engaging bottom to an end thereby defining at least part of the volume configured to receive the support protrusion of the cowl louver structure.

5. The cowl louver clip assembly of claim 4, wherein the engaging arm extends at an oblique angle to the inner surface of the wall engaging bottom.

6. The cowl louver clip assembly of claim 4 comprising a pair of engaging arms that extends toward the windshield engaging top from the inner surface of the wall engaging bottom to ends thereby defining at least part of the volume configured to receive the support protrusion of the cowl louver structure.

7. The cowl louver clip assembly of claim 1, wherein the windshield engaging top includes an inner surface and a top guide projection extending outwardly from the inner surface of the windshield engaging top defining at least part of the volume configured to receive the support protrusion of the cowl louver structure.

8. The cowl louver clip assembly of claim 1, wherein the protrusion receiving body includes opposite side walls that extend between the windshield receiving end, the windshield engaging top and the protrusion receiving end.

9. The cowl louver clip assembly of claim 8, wherein the side walls each include an inner surface and a side guide projection defining at least part of the volume configured to receive the support protrusion of the cowl louver structure.

10. A vehicle comprising:
    a cowl louver structure including a windshield receiving recess that extends in a vehicle lateral direction,
    a windshield located in the windshield receiving recess; and
    a cowl louver clip assembly located in the windshield receiving recess engaging the windshield, the cowl louver clip assembly comprising:
       a protrusion receiving body including a windshield receiving end, a windshield engaging top and a protrusion receiving end, the protrusion receiving body having a volume in which a support protrusion of the cowl louver structure is located; and
       a protector member that extends along the windshield engaging top of the protrusion receiving body, the protector member being engaged with the windshield along the windshield engaging top.

11. The vehicle of claim 10, wherein the protrusion receiving body includes a wall engaging bottom and the windshield receiving end has a guide surface that extends between the windshield engaging top and the wall engaging bottom, wherein the guide surface extends at an oblique angle to the windshield engaging top and the wall engaging bottom.

12. The vehicle of claim 10, wherein the protrusion receiving body includes a wall engaging bottom having an inner surface and an engaging arm that extends toward the windshield engaging top from the inner surface of the wall engaging bottom to an end thereby defining at least part of the volume configured to receive the support protrusion of the cowl louver structure.

13. The vehicle of claim 12, wherein the engaging arm extends at an oblique angle to the inner surface of the wall engaging bottom.

14. The vehicle of claim 12 comprising a pair of engaging arms that extends toward the windshield engaging top from the inner surface of the wall engaging bottom to ends thereby defining at least part of the volume configured to receive the support protrusion of the cowl louver structure.

15. The vehicle of claim 10, wherein the windshield engaging top includes an inner surface and a top guide projection extending outwardly from the inner surface of the windshield engaging top defining at least part of the volume configured to receive the support protrusion of the cowl louver structure.

16. The vehicle of claim 10, wherein the protrusion receiving body includes opposite side walls that extend between the windshield receiving end, the windshield engaging top and the protrusion receiving end, wherein the side walls each include an inner surface and a side guide projection defining at least part of the volume configured to receive the support protrusion of the cowl louver structure.

17. A method of connecting a windshield to a cowl louver structure of a vehicle, the method comprising:
    providing a cowl louver clip assembly comprising:
       a protrusion receiving body including a windshield receiving end, a windshield engaging top and a protrusion receiving end, the protrusion receiving body having a volume configured to receive a support protrusion of a cowl louver structure; and
       a protector member that extends along the windshield engaging top of the protrusion receiving body;
    inserting a support projection of the cowl louver structure into the volume of the protrusion receiving body of the cowl louver clip assembly thereby placing the cowl louver clip assembly within a windshield receiving recess of the cowl louver structure such that a gap is formed between the windshield engaging top of the protrusion receiving body and an outer support wall of the cowl louver structure; and
    inserting a windshield into the gap formed between the windshield engaging top of the protrusion receiving body and the outer support wall of the cowl louver structure with the protector member engaging the windshield.

18. The method of claim 17, wherein the protrusion receiving body includes a wall engaging bottom and the windshield receiving end has a guide surface that extends between the windshield engaging top and the wall engaging bottom, wherein the guide surface extends at an oblique angle to the windshield engaging top and the wall engaging bottom.

19. The method of claim 17, wherein the protrusion receiving body includes a wall engaging bottom having an inner surface and an engaging arm that extends toward the windshield engaging top from the inner surface of the wall engaging bottom to an end thereby defining at least part of the volume configured to receive the support protrusion of the cowl louver structure, wherein the engaging arm extends at an oblique angle to the inner surface of the wall engaging bottom.

* * * * *